Patented Nov. 16, 1926.

1,607,491

UNITED STATES PATENT OFFICE.

ROBERT FRASER THOMSON AND JOHN THOMAS, OF GRANGEMOUTH, SCOTLAND, ASSIGNORS TO SCOTTISH DYES, LIMITED, OF GRANGEMOUTH, SCOTLAND.

DIBENZANTHRONYL PRODUCT AND PREPARATION THEREOF.

No Drawing. Application filed February 20, 1926, Serial No. 89,768, and in Great Britain October 21, 1924.

This invention relates to the manufacture of dyestuffs and intermediates for the production of dyestuffs.

It has for its object to provide new methods of making colouring matters, particularly intermediates for the manufacture of dyestuffs of the benzanthrone series.

To that end we have made experiments and we have discovered that when benzanthrone is treated under certain conditions, for example by manganese dioxide and sulphuric acid, either of two reactions may take place, namely, a condensation of two benzanthrone molecules or an oxidation of benzanthrone.

The result of the first process may be regarded as the formation of a dibenzanthronyl different from the dibenzanthronyl previously known, that is the body prepared by the condensation of benzanthrone in a mild alkaline medium, in that on fusion with caustic alkali it will yield dibenzanthrone.

The result of the second process is the formation of oxy-benzanthrone which we have found can be alkylated and the product fused with caustic alkali, thus giving colouring matters.

The invention consists in the treatment of benzanthrone with an oxidizing agent comprising, for example, manganese dioxide and sulphuric acid to such a degree as to yield a dibenzanthronyl as herein defined.

The invention also consists in the processes hereinafter described and in products when produced thereby.

The following examples illustrate how the invention may be carried into effect, all parts in these examples being parts by weight:—

Example 1.

This deals with the production of a dibenzanthronyl as defined above from benzanthrone.

According to this example 23 parts of benzanthrone are dissolved in 400 parts of concentrated sulphuric acid at 60° C. 15 parts of 84 per cent manganese dioxide are then mixed with 45 parts of concentrated sulphuric acid and added to the mixture over a period of 1 hour at 60° C. The mixture is maintained at 60° C. until the red-violet colour of the acid solution does not become any bluer, which generally is the case in 5 to 6 hours. The melt is then poured into water, treated with sodium bisulphite liquor and filtered. The crude product is freed from hydroxy bodies by extraction with 500 parts of a boiling 0.5 per cent solution of caustic soda. It is then washed thoroughly with water and dried. It can be freed from soluble impurities by treatment with benzene and can be recrystallized from nitrobenzene. From this solvent it is obtained in brown needles which melt above 300° C. and dissolve in concentrated sulphuric acid with an intense violet-red colour devoid of fluorescence.

Example 2.

This deals with the oxidation of the dibenzanthronyl of Example 1.

According to this example 10 parts of the dibenzanthronyl body prepared by the process of Example 1 are dissolved in 200 parts of concentrated sulphuric acid and treated at ordinary temperature with a mixture of 35 parts of manganese dioxide and 200 parts of sulphuric acid. The mixture is stirred for several hours until no further change is observed. The melt is then blown into a large excess of water and boiled, destroying any excess of manganese dioxide with sodium bisulphite or the like. It is then filtered and the solid matter is washed.

This process yields a reddish body which becomes violet in alkaline suspension but is not apparently soluble in alkali nor in alkaline hydrosulphite. It dissolves in concentrated sulphuric acid with an intense violet colour.

Example 3.

This deals with the conversion of the dibenzanthronyl body of Example 1 to dibenzanthrone.

According to this example a closed stirrer pan is charged with 175 parts of caustic potash and 105 parts of alcohol, the mixture is well stirred and heated to 125° C. The pan is then quickly charged with 50 parts of dibenzanthronyl prepared as described above and the temperature raised and maintained at 180° C. for 30 minutes, then raised to 200° C. for 30 minutes. The melt is then treated with water and boiled until no more dyestuff separates. It is then filtered and washed. The yield is over 46 parts of dibenzanthrone of very high purity.

This dibenzanthrone dissolves in alkaline hydrosulphite and dyes cotton dark bluish-violet shades.

General.

Modifications may be made in the processes described above, for instance in place of the caustic alkali mentioned, other caustic alkalies may be used including aqueous or alcoholic potash or the like. If the process of Example 1 be carried into effect with a larger quantity of oxidizing agent a greater amount of substance which is insoluble in caustic soda solution is obtained.

Purification of the colouring matters may be effected by precipitation from sulphuric acid solution by means of a non-solvent.

In place of benzanthrone derivatives of benzanthrone may be employed, for example chlorinated benzanthrone, for instance mono-chlor-benzanthrone prepared from 2-chlor-anthraquinone by reduction and condensation with glycerine.

Where in this specification and claims dibenzanthrone is mentioned, derivatives are included.

Having now described our invention what we claim as new and desire to secure by Letters Patent is:—

1. The process of treating benzanthrone which comprises subjecting the same to the oxidizing action of manganese dioxide and sulphuric acid, the oxidation being of such a degree as to produce dibenzanthronyl.

2. The method of preparing dibenzanthronyl which comprises dissolving benzanthrone in concentrated sulphuric acid, mixing manganese dioxide and sulphuric acid with the resultant solution, pouring the resulting mixture into water containing a bisulphite, and separating the solid and liquid products.

3. A process of oxidizing benzanthrone into dibenzanthronyl which comprises the steps of dissolving 23 parts of benzanthrone in 400 parts of concentrated sulphuric acid and adding a mixture of 15 parts of 84 per cent manganese dioxide with 45 parts of concentrated sulphuric acid, and maintaining the mass at about 60° C. for about five to six hours, after which the melt is poured into water and treated with a bisulphite, and the solid and liquid products separated by filtration.

In testimony whereof we have signed our names to this specification.

ROBERT FRASER THOMSON.
JOHN THOMAS.